May 5, 1970     R. KETTENMANN ET AL     3,509,692
DEVICE FOR TRANSFERRING ARTICLES ONTO TRAYS
Filed June 15, 1967     3 Sheets-Sheet 1

INVENTORS
ROLF KETTENMANN
EBERHARD MÜLLER-LOBECK

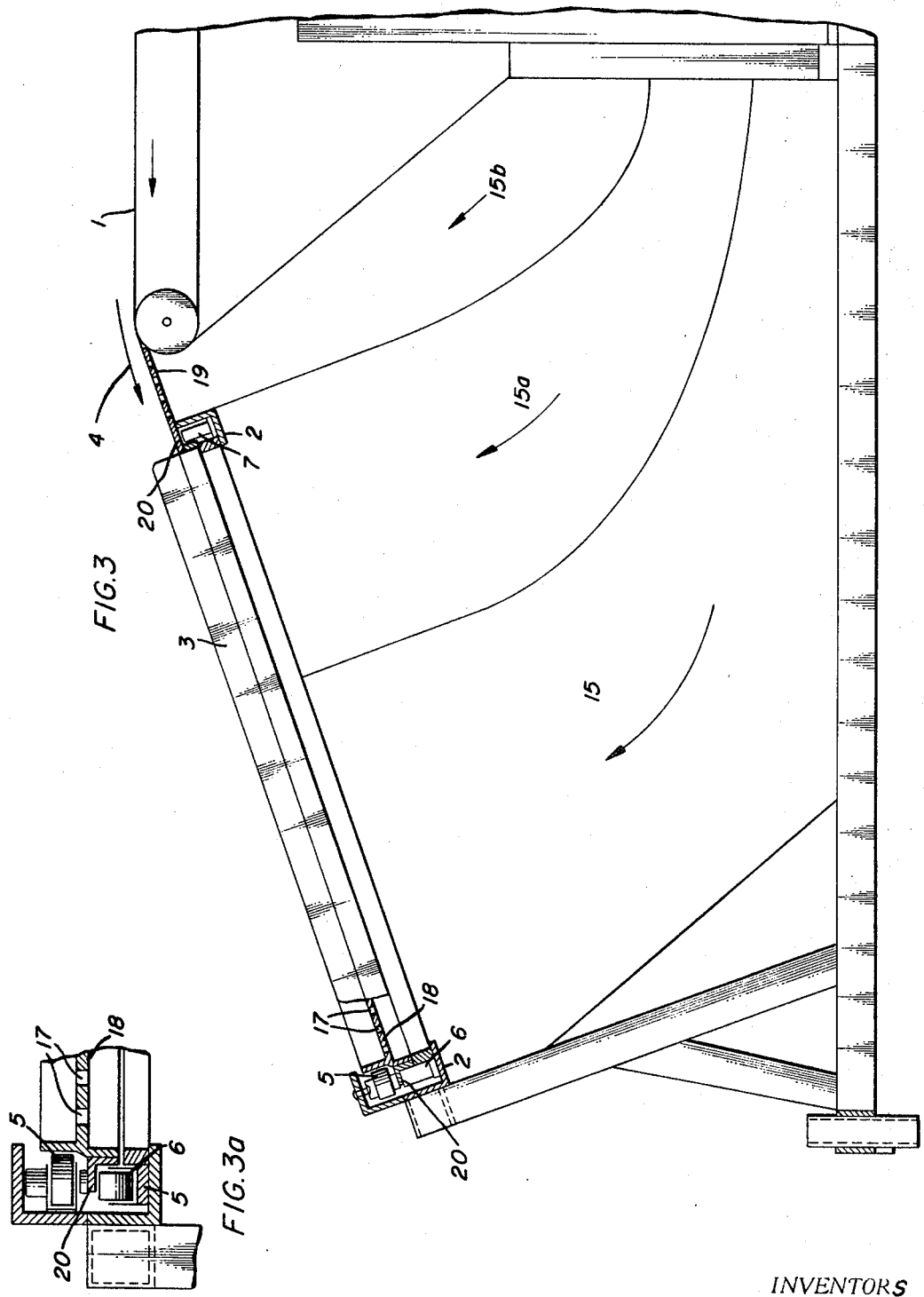

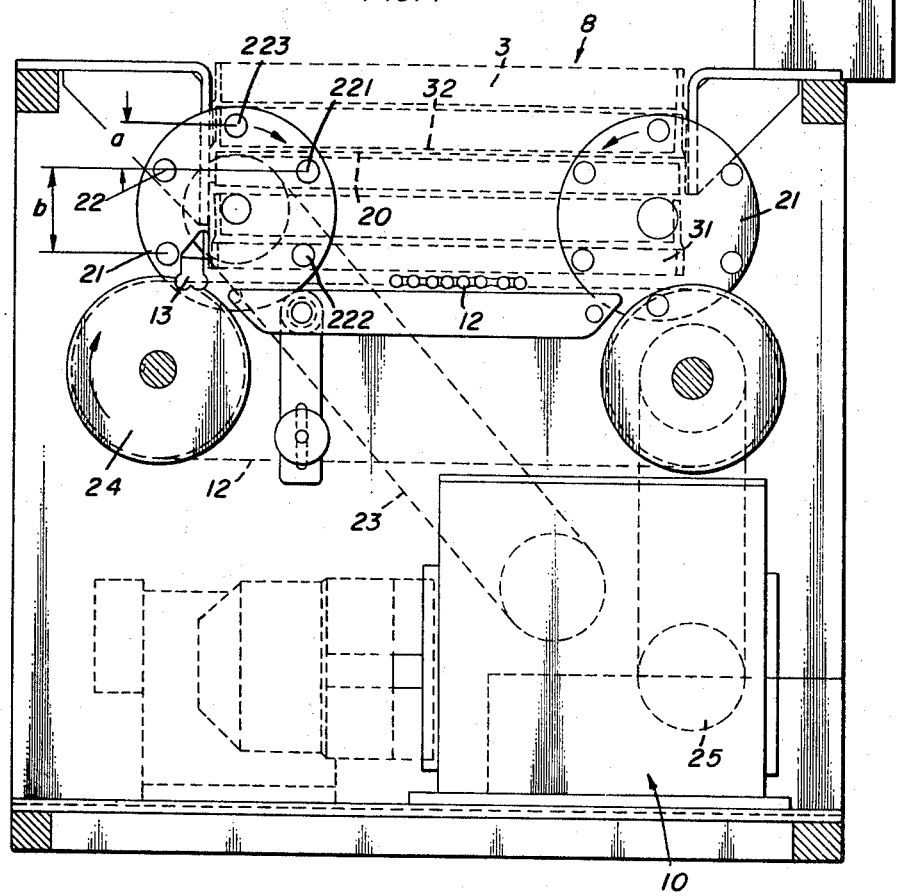
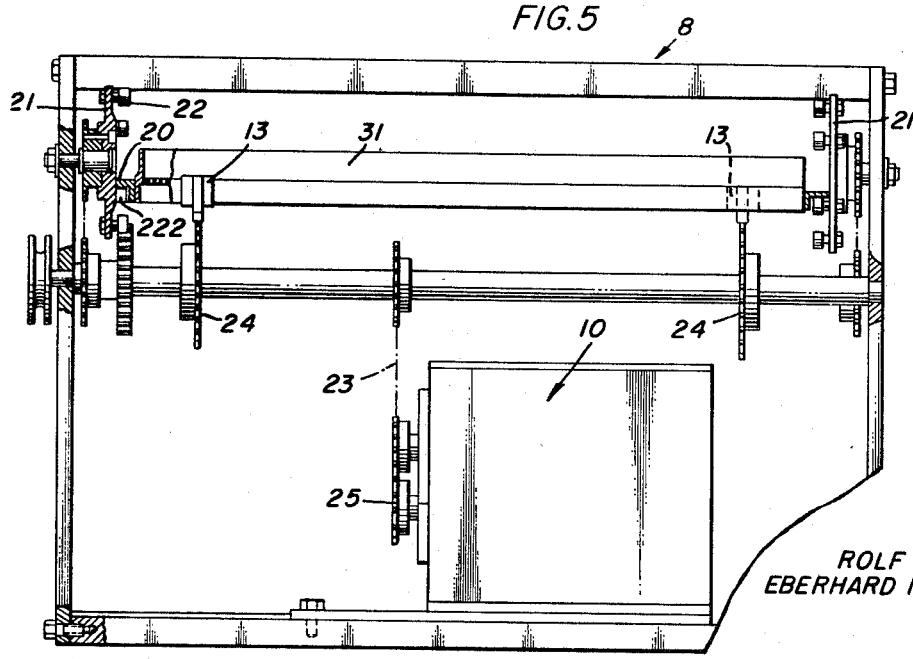

3,509,692
DEVICE FOR TRANSFERRING ARTICLES ONTO TRAYS
Rolf Kettenmann, Stuttgart-Mohringen, and Eberhard Müller-Lobeck, Stuttgart-Feuerbach, Germany, assignors to Firma Schoko-Buck G.m.b.H., Stuttgart, Germany
Filed June 15, 1967, Ser. No. 646,375
Claims priority, application Germany, June 24, 1966, Sch 39,168
Int. Cl. B65b *1/06, 5/00*
U.S. Cl. 53—250                                     9 Claims

ABSTRACT OF THE DISCLOSURE

The present invention relates to a machine for removing articles, particularly chocolates or other confectionery, from a conveyor and transferring them to pallets on a cushion of air. The rotatable cam stacking device is to stack the full pallets in a vertical stack with the new pallets being added to the bottom of the stack and a similar stacking apparatus for individually removing empty stacked pallets from the bottom of a stack of empty pallets. Each of the pallets is provided with an air permeable bottom support surface through which compressed air is blown to support the articles on a cushion of air as they slide on to the pallet. These stacking devices include rotatable members having cam-like projections on their periphery so that adjacent cam-like projections will engage adjacent pallets and move the adjacent pallets relative to each other in correspondence with the change in vertical spacing between the adjacent projections during rotation of the rotatable members. Preferably, the pallets are inclined in the direction of transport and automatically moved into and out of an immediately adjacent loading position with respect to an endless horizontally extending conveyor belt.

---

Confectionery articles that are provided with a machine applied chocolate coating are generally aligned in a single layer on conveyor belts as they are generally aligned in a single layer on conveyor belts as they are guided through the coating device and subsequently through cooling tunnels. To allow further processing or packaging, the individual chocolates must be removed from the conveyor belt, which has generally been accomplished by hand with several persons assigned to each belt to pick up the chocolates and place them in tray like containers known as pallets. The pallets loaded with chocolates are then removed and transported for further processing or packaging. The prior art removal of the chocolates from the conveyor belt by hand is very time consuming and very expensive. Also, the individual handling of the chocolates has the additional disadvantage that the chocolates may become damaged or contaminated, which would be unhygienic.

It is known in the prior art to provide an inclined receiving plate immediately adjacent to the conveyor so that the pieces of confectionery that are transferred by the conveyor belt will tend to slide on to the receiving plate due to their own weight and the inclination of the receiving plate. This prior art device has the disadvantage that the receiving plate becomes quite sticky in places because of deposited sugar or other coating material rubbed off of the sliding confectionery. These sticky places may cause the confectionery to pile up in an undesirable manner. This disadvantage is particularly serious when the device is used for removing chocolates, because the chocolate covering is particularly susceptible to being rubbed off during sliding of the confectionery; with chocolates, the piling up is to be expected and many times will result in the uncontrolled falling and tumbling of the chocolates on to the inclined plate.

It is an object of the present invention to overcome the disadvantages mentioned above in regard to the prior art devices and to enable the automatic removal of chocolates from a conveyor device without damaging the chocolates or touching them by hand.

According to the present invention, there is provided an apparatus for transferring articles from one article operating device to another, which comprises an exchangeable pallet inclined in the direction of transport and immediately adjacent to a substantially horizontally extending endless conveyor belt. The bottom of each pallet is uniformly air permeable and receives a current of compressed air through the air guide ducts therein so that the articles may slide along the pallet on a cushion of compressed air. A transfer device is designed to be operated in dependence upon the degree to which the associated pallet has been filled for the purpose of removing a full pallet and replacing it with an empty pallet to provide for the automatic changing of pallets. In this manner, the articles, particularly chocolates, slide on to the pallet on an air cushion from the discharge and of the conveyor belt, so that firstly all damage to the bottom of the belt is avoided and secondly it is not possible for the chocolates to stick to the bottom of the pallet. At the same time, the manual changing of the receiving pallet and replacing it with an empty pallet which was necessary with the prior art type of device is eliminated; although this may not have been too disadvantageous in the prior art devices because an operator was required to be present at all times to prevent piling up by manual intervention, the present invention does not require such an operator and has a corresponding saving in expense.

With the present device, the intensity of the air cushion is adjustable so that the device may be employed with various types of articles and the angle of inclination of the pallet with respect to the conveyor is also adjustable to provide for the optimum operating conditions with respect to a particular article.

Usually, it is necessary to only adjust one of these two adjustments when changing types of articles.

It is a particularly advantageous feature of the present invention that the pallets are stackable and associated with a stacking device for the empty pallets prior to their transport to the conveyor and a stacking device for the full pallets after they are removed from the conveyor. A transfer device for supplying empty pallets to the conveyor and removing the full pallets from the conveyor consists of a step wise movable endless chain having cam projections for drivingly engaging the pallets. Each stacking device is provide with lifting devices for supporting the respective pallet stack and releasing the lowermost pallet for removal by the transfer device or for reception of the lower most pallet from the transfer device for the empty and full pallets, respectively. In this manner, abrupt dropping of the empty stack and sudden lifting of the full stack may be avoided.

Each of the stacking devices may comprise a plurality of rotatable members driven simultaneously in a step by step rotatable manner about corresponding axes and mounted in coaxial and transverse pairs overlapping the frame of a corresponding pallet with a spacing corresponding to the dimensions of the pallet. The faces of the rotatable members adjacent to the corresponding pallet are provided with axially extending cam projections, preferably six bolts for each member, which are mounted uniformly on a circle concentric with respect to the axis of rotation of the associated rotatable member. Each of the pallets is provided with side supporting bars for engaging the cam projections of the rotatable members. The distance between a straight line passing through the centers of bolts having an angular spacing of 120° for each rotatable member and the bolt radially outwards of the straight line is most advantageously at most as great as the distance between the bottom edges of the supporting bars of two adjacent pallets stacked directly upon each other, so that the lower most pallet may quickly be detached from the pallet stack while the remainder of the pallets move downwardly slowly with respect to the stacking device for the empty pallets, with a similar situation occurring with respect to the stacking device for the full pallets. The above described advantageous operation is due to the fact that with six uniformly distributed bolts, the vertical distance between adjacent bolts engaging adjacent pallets becomes increasingly greater with rotation of the rotatable members to separate the adjacent pallets until the bottom most pallet is seized by the transfer device, with respect to the stacking device associated with the stacked empty pallets for removing the empty pallets one by one from the bottom of the stack.

In order to prevent chocolates from sliding off of the conveyor belt and being lost during the change from a filled pallet to an empty pallet, provision may be made for the side end faces of the pallets to be flat so that the pallets may be transferred in abuting engagement to present a continuous receiving edge to the conveyor. That is, a filled pallet is pushed away by the adjoining flat end face of an empty pallet.

Advantageously, the transfer device may be automatically operated by means of a switch controlled by a weighing machine that will actuate the switch in response to a predetermined weight of the pallet corresponding to a full pallet. Also, the transfer device may be actuated by optical sensing means responding when the pallet is full.

Further objects, features and advantages of the present invention will become more clear from the following description of a single preferred embodiment of the present invention, with regard to the accompanying drawing, wherein:

FIG. 3 is a diagrammatical cross sectional view, on an enlarged scale, through a portion of the device as shown in FIG. 2, with the pallet lying immediately adjacent to the conveyor for receiving chocolates;

FIG. 3a is an enlarged partial cross sectional view of a portion of the device shown in FIG. 3;

FIG. 4 is a diagrammatical front elevation view of one of the two stacking devices; and FIG. 5 is a diagrammatical side elevation view of the stacking device according to FIG. 4.

Figure 1:
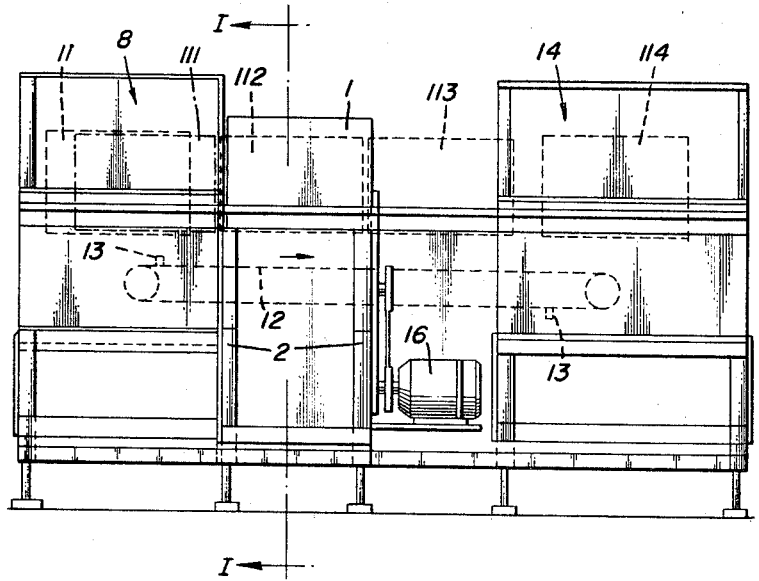
FIG. 1 is a diagrammatically front elevation view of an article handling device according to the present invention, particularly for transferring chocolates from a conveyor belt to a pallet and thereafter storing the pallets.
Figure 2:
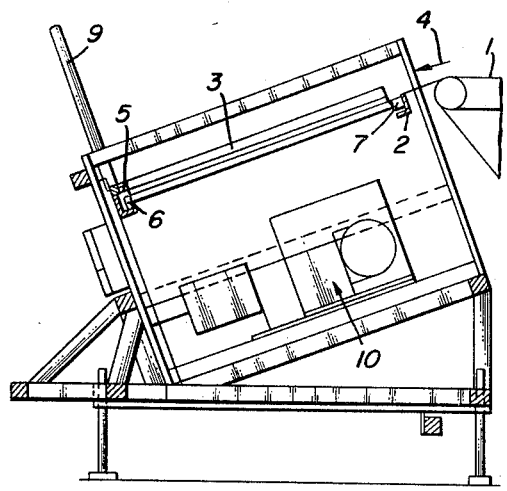
FIG. 2 is a diagrammatical cross sectional view taken on line I—I of FIG. 1.

As shown in FIGS. 1 and 2, the apparatus is provided with an endless horizontally extending conveyor belt 1 for transporting articles, for example chocolates from a coating device, and delivering them to a holding device 2 that receives therein a pallet 3 on to which the articles, chocolates, are slid from the conveyor belt 1 in the direction of the arrow 4. The pallet 3 is supported by a plurality of rollers 5, 6, 7, which press against the outer surfaces of the pallet or against the side supporting bars of the pallet 3. The supporting rollers 5, 6, 7, the pallet 3 and the holding device 2 form the receiving station for the chocolates transported by the belt 1.

To the left of FIG. 1 and directly adjoining the receiving station, there is provided a stacking device 8 for storing a plurality of empty pallets and delivering them individually, which will be discussed in more detail below. The plurality of empty pallets, not shown, are disposed in a substantially vertical stack and held by the supporting rail 9, FIG. 2. In a mechanism to be described below, the lower most pallet of the stack of empty pallets in the stacking device 8 is detached in the downward direction from the stack and brought from the storage position 11, shown in broken lines in FIG. 1, to the intermediate position 111, shown in dot-dash lines. From the intermediate position 111, the empty pallet is drivingly engaged by cams 13 on a chain conveyor 12 driven by a motor-gear reduction unit 10 and moved into the receiving position 112.

Simultaneously with the above described transfer of the empty pallet, the pallet at the receiving station, which has been filled with chocolates, is moved to the position 113 by the conveyor 12 and cams 13. When the new transferred pallet has been positioned at the receiving station 112 long enough to become filled with chocolates, the cycle is repeated, and the pallet previously at the position 113 is simultaneously removed by the conveyor 12 and cams 13 to the position 114 beneath a stacking device 14 that is in an adjoining position to the right in FIG. 1. At position 114, the full pallet is then stacked with other full pallets on the bottom of the stack, that is the stacking of the full pallets is from the bottom to the top. Lifting means are provided to lift the stack and separate the lower most pallet for the stacking device 14 that is similar in construction to those provided for the stacking device 8. During operation of the transfer device 12, 13, the unillustrated stack of filled pallets associated with the stacking device 14, that is the full stack, increases while the stack of empty pallets at the stacking device 8, that is the empty stack, decreases step by step. Periodically, the full stack may be removed and transported to further processing devices by conventional transporters, and similarly, emptied pallets may be restacked at the stacking device 8 to replace those removed by the transfer device 12, 13.

As shown in FIG. 3, there are provided a plurality of compressed air guiding ducts 15, 15a and 15b, which receive in transport compressed air from a blower (not illustrated) that is driven by the motor 16 (FIG. 1). The ducts are provided beneath the receiving position of the holding device 2. When the blowers are actuated, the pallet 3 that is at the receiving position receives air from below in the direction of the arrows. The bottom of the pallet 3 is provided with a plurality of holes 17 uniformly distributed on the bottom 18 to allow escape of the compressed air from the ducts 15 and 15a to form an air cushion that reduces friction and supports the chocolates or other articles sliding onto the inclined pallet 3 from the conveyor belt 1 in the direction of the arrow 4. A sieve plate 19 covers the exit end of the duct 15b and is provided with similar openings to produce a cushion of compressed air for similarly supporting the chocolates or other articles in a frictionless manner during their travel from the conveyor 1 to the pallet 3. The air cushion prevents the bottom of the chocolates from sticking to the support and also assures that the chocolates lying in a single layer on the conveyor belt 1 will slide in the proper aligned manner with very little friction into a single layer once again on the pallet 3 without changing their position in relative to the support, that is without overturning or falling with respect to the pallet 3.

As shown in FIG. 3 and on an enlarged scale in FIG. 3a, each of the pallets 3 is provided at its outer edges with a supporting bar 20 which has a bottom surface supportingly engaged by the rollers 6 and 7 to support the pallets at their various positions and during their transfer. The roller 5 engages the lowermost side of the pallet 3 to absorb the horizontal component of force due to the inclined position of the pallet 3. The rollers 5, 6 and 7 are suitably journaled in a relatively stationary frame.

FIGS. 4 and 5 illustrate the stacking device 8; the stacking device 14 is similar in construction to the stacking device 8 and therefore will not be described in detail. Three pallets 3 are shown in dot-dash lines as stacked vertically upon each other. The rotatable members 21 are suitably journaled on axes of rotation, respectively, and are driven step by step inside of the stacking device 8. The rotatable members 21 are mounted coaxially in pairs and transversely in pairs to overlap the frame of the adjacent pallet 3, and spaced apart distances substantially corresponding to the corresponding dimensions of the associated pallet 3. On the inward faces of the rotatable members 21, there are provided six axially projecting identical cams or bolts 22, which are uniformly distributed on a circle concentric with respect to the axis of rotation of the associated rotatable member. A motor-gear reduction unit 10 is suitably controlled to drive a chain and sprocket gear arrangement 23 in a stepwise manner to simultaneously rotate all of the rotatable members 21 in a rotational stepwise manner; the specific details of the drive mechanism have not been illustrated for the sake of simplicity and clarity to concentrate on the more important details of the present invention, as shown in FIG. 4.

The operation of the stacking device 8 is similar to and may be considered as being opposite from the operation of the stacking device 14. When a pallet has been filled at the receiving station, the rotary movement of the rotatable members 21 and the chain wheels 24 is automatically initiated through suitable contact means, for example by an automatic weighing device that determines the full weight of the pallet and produces a corresponding actuating signal. As shown in FIG. 4, the left hand rotatable member 21 rotates in the clockwise direction while the right hand rotatable member 21 rotates in the counterclockwise direction with the topmost projection 223 of the projections 22 engaging the top pallet 3, the next projection 221, in the direction of rotation, engaging the immediately adjacent lower pallet 32, and the adjacent projection 222, in the direction of rotation, engaging the lowermost pallet 31. With rotation of the rotatable member 21, the vertical spacing between the projections 223 and 221 increases at a slower rate than the vertical spacing between the projections 221 and 222, so that the lowermost pallet 31 separates from and increases in spacing from the immediately adjacent upper pallet 32. The cam 13 of the transfer device 12 will move to the right (FIG. 1) until it strikes against the pallet lying at the receiving station. The pallet 31 will normally stay in this position (111 of FIG. 1) until the pallet at the receiving station has been filled. After the filling of the pallet at the receiving station, rotation of the rotatable members 21 and the wheels 24 is effected by the chain 12 so that the pallet 31 is moved into the receiving station. At the same time, the cam projection 221 on the rotatable member 21 in the position illustrated in FIG. 4 engages beneath the supporting bar 20 of the pallet 32 and moves the distance $b$ to the position shown in FIG. 4 for the cam 222, so that the pallet 32 is separated from the remainder of the stack in a manner similar to the above described separation of the pallet 31. During the above described movement of the bolt 221 through the distance $b$, the bolt 223 moves through only the vertical distance $a$ to a position occupied by the bolt 221 in FIG. 4 and the bolt 22 moves a corresponding distance $a$ to the position occupied by the bolt 223 in FIG. 4, so that the next adjacent pallets are carried and supported by the bolts 223 and 221, respectively. The pallet that has reached the lowermost position and been separated from the adjacent pallets above in the stack, is moved a short distance by the transfer device 12, 13 to the position 111 (FIG. 1) where it is in abutting engagement with a preceding pallet at the receiving position. To provide suitable abutment between adjacent pallets, the end side faces of the pallets are flat and straight. The rotatable members 21 remain stationary while the pallet at the receiving station is filled and thereafter the cycle is repeated accordingly in an automatic fashion.

The rotatable members 21 are provided with the bolts 22 (221, 222, 223) mounted so that the vertical distance $a$ between a straight line passing through the centers of the bolts 22 and 221 disposed angularly with respect to each other at 120° and the center of the intermediate outwardly spaced bolt 223 corresponds to the distance between the bottom edges of the supporting bars 20 of the pallets 3 and 32 when in their stacked position. With such a construction, two immediately adjacent bolts always support two adjacent pallets by the action of their dead weights throughout all of the operation. If the distance $a$ were shorter than the distance between the bottom edges of the supporting bars, there would be the disadvantageous result that the stack would be abruptly dropped during each cycle.

The stacking device 14 for stacking the full pallets is constructed similarly to the stacking device 8 for the empty pallets, with the exception that the bolts 22 lift the pallets from the transfer device 13 and at the same time raise the stack of full pallets from the bottom in the upward direction so that the newly added pallet is added to the bottom of the stack and raised at a greater rate of speed than the main body of the stack until the two are in engagement. For each cycle, the movement of the empty pallet from the position 11 to the position 111 corresponds to the movement of the full pallet from the position 113 to the position 114, as shown in FIG. 1. In the stacking device 8, this movement serves to move the empty pallet away from the bolts or cam projections 22 of the rotatable members 21 and in the stacking device 14 serves to move the full pallet into the range of action of the lifting bolts of the corresponding rotatable members of the stacking device 14, respectively.

As shown in FIGS. 4 and 5, there are provided four rotatable members 21 for each of the stacking devices 8 and 14, which rotatable members have a corresponding number of bolts 22. FIGURE 5 clearly shows the engagement of the bolts 222 beneath the supporting bar 20 of the pallet 31 to separate the latter from the remainder of the stack, which was not illustrated in detail in FIG. 1. The drive mechanism for the rotatable members 21 and the chain wheels 24 has not been illustrated in detail for purposes of clarity. It will be readily understood by those having ordinary skill in the art. In this respect, it is to be observed that the wheels 24 should be driven through the drive pinion 25 separately from the drive of the rotatable members 21 so that during displacement of the pallet from the position 11 to the position 111 (FIG. 1) there is only a movement of the conveyor chain or transfer device 12 but no movement of the rotatable members 21. Thus as seen in FIG. 4, the bolts or projections 22 will act as horizontal guides for the associated pallet during the operation of the transfer device in shifting the pallet from the position 11 to the position 111 until the supporting bars 20 of the pallet are pushed on to the horizontally extending rollers 6 and 7 associated with the transfer device. The drive for the rotatable members 21 and wheels 24 may be accomplished by means of two separate shafts, each of which is provided with a chain drive, or the like, that is separately controlled from the pinions 25 and the drive chain 23, in which case the gear reduction motor unit 10 would be of a suitable construction having automatic controls.

Although the above device has been described specifically in regard to removing chocolates, or the like, from a conveyor belt and to sliding them on to pallets, the present invention may broadly be utilized conversly for loading a conveyor belt with chocolates lying in one layer on filled pallets. For such a purpose, it would only be necessary for the pallet to be inclined upwardly away from the conveyor belt so that the chocolates, or the like, would slide from the pallet on to the belt.

The foregoing preferred embodiment has been set forth in detail for the purposes of illustration and in regard to the narrow aspects of the present invention; further embodiments, modifications and variations are contemplated

We claim:

1. An article transfer device, comprising: conveyor means for moving the articles in a conveying direction; a removable pallet immediately adjacent to said conveyor means, inclined in the conveying direction and having an air permeable bottom article support surface; means for supplying compressed air to said pallet support surface for moving the compressed air upwardly through said permeable support surface for supporting the articles on an air cushion while on said pallet, wherein said conveyor means is an endless conveyor belt; at least one additional pallet substantially identical to said first mentioned pallet; transfer means for moving said first mentioned pallet away from said conveyor means and moving said additional pallet automatically into a corresponding inclined position adjacent to said conveyor means for automatically changing pallets.

2. The apparatus of claim 1, including means for selectively adjusting the angle of inclination of the pallet immediately adjacent to said conveyor means, wherein each of said pallets includes inter-engaging means for providing a stable stackable relationship with the other of said pallets; means for stacking the full pallets and means for stacking empty pallets.

3. The apparatus of claim 2, wherein said transfer means includes an endless chain having cam means for drivingly engaging said pallets and moving them in a step by step manner.

4. The apparatus of claim 3 wherein each of said stacking means includes lifting means for supporting the stacked pallets and separating the lower-most pallet for movement by said transfer means to and from, respectively, stacked relationship.

5. The apparatus of claim 4, wherein each of said lifting means includes rotatable members having means for driving them in step by step rotation and mounting them in coaxial pairs immediately adjacent to and overlapping an associated stack of pallets; said rotatable members being spaced from each other distances substantially corresponding to the dimensions of an immediately adjacent pallet; each of said rotatable members having a plurality of generally axially projecting cam projection means mounted uniformly on a circle substantially concentric with the axis of rotation of the corresponding rotatable member; at least two adjacent cam projection means engaging the bottom most and immediately adjacent pallet, respectively, for moving them toward or away from each other in correspondence with one or the other direction of rotation of the associated rotatable member.

6. The apparatus of claim 5, wherein each of said rotatable members includes only six cam projection means; the radial distance between a straight line passing through the centers of two cam projection means having an angular spacing of 120° and the center of the cam projection radially outward from said straight line is at most as great as the distance between the cam engaging supporting portions of two adjacent pallets stacked directly on each other.

7. The apparatus of claim 2, wherein the outer side faces of each of said pallets are flat and straight.

8. The apparatus of claim 1, wherein said means for supplying compressed air is adjustable to vary the intensity of the air current on the associated pallet and, accordingly, the strength of the air cushion, and wherein each of said pallets includes inter-engaging means for providing a stable stackable relationship with the other of said pallets; means for stacking the full pallets and means for stacking empty pallets.

9. The apparatus of claim 2, wherein each of said stacking means includes lifting means for supporting the stacked pallets and separating the lower-most pallet for movement by said transfer means to and from, respectively, stacked relationship.

References Cited

UNITED STATES PATENTS

| | | | |
|---|---|---|---|
| 2,176,307 | 10/1939 | Lamb et al. | 214—1 X |
| 2,251,197 | 7/1941 | Nestmann | 198—85 |
| 2,744,372 | 5/1956 | Cleaveland et al. | 214—6.2 X |
| 2,940,327 | 6/1960 | Gartner | 214—6.2 X |
| 3,075,625 | 1/1963 | Randall | 214—1 X |

THERON E. CONDON, Primary Examiner

R. L. SPRUILL, Assistant Examiner